United States Patent [19]

Franklin

[11] Patent Number: 5,509,377
[45] Date of Patent: Apr. 23, 1996

[54] HAY FEEDER

[76] Inventor: Hans J. Franklin, 2365 Aspen Dr., Pampa, Tex. 79065-3018

[21] Appl. No.: 279,558

[22] Filed: Jul. 25, 1994

[51] Int. Cl.$^6$ .................................................. A01K 1/10
[52] U.S. Cl. .................................................. 119/60
[58] Field of Search .................................. 119/58, 60

[56] References Cited

U.S. PATENT DOCUMENTS

| | | | |
|---|---|---|---|
| 376,529 | 1/1888 | Kline | 119/60 |
| 492,473 | 2/1893 | Reid | 119/60 |
| 1,018,095 | 2/1912 | Brown | 119/60 |
| 4,020,794 | 5/1977 | Nethery | 119/60 X |

FOREIGN PATENT DOCUMENTS 667368  10/1988  Switzerland .................. 119/58

*Primary Examiner*—Robert P. Swiatek
*Attorney, Agent, or Firm*—Cary R. Reeves

[57] ABSTRACT

A hay feeder comprising a container for holding hay and having an open top to provide access to the hay. A wire mesh float rests on top of the hay. As hay is removed from the container the float moves down with the diminishing level of the hay. The wire mesh float allows a feeding animal to reach the hay but prevents the animal from rooting in the hay. In a preferred embodiment, the feeder includes a hinged bottom through which hay can be loaded. An extensible handle provides leverage for flipping the feeder over.

3 Claims, 2 Drawing Sheets

BOTTOM

BOTTOM

TOP

SECTION

FLOAT

HAY FEEDER

BACKGROUND OF THE INVENTION

The present invention relates generally to feeders for containing hay fed to livestock and more specifically to feeders adapted to prevent waste and contamination of the hay.

Containers are often used to facilitate feeding hay to animals. These containers provide a repository for a quantity of hay from which the animals can self-feed. Various feeder configurations have been sold commercially. A typical feeder includes a cylindrical sheet metal base open at the bottom and top. This kind of feeder helps to separate the hay from animal waste and prevent the animals from walking in the hay. It also prevents the hay from blowing away after the level of the hay reaches the sheet metal base, and being wasted. Some prior art feeders include bars extending above the base. The bars are spaced to accomodate the head and neck of the animal.

A problem with prior art feeders is that they allow the animals to root through the hay in search of the most palatable hay. As the animals root through the hay they drop a large amount of it on the ground, resulting in waste and contamination. Later, if the animals get around to eating the hay left on the ground, they often ingest contaminants such as sand and animal waste.

SUMMARY OF THE INVENTION

The present invention solves these problems and others by providing a hay feeder comprising a container for holding the hay and having an open top to provide access to the hay. A wire mesh float rests on top of the hay. As hay is removed from the container the float moves down with the diminishing level of the hay. The wire mesh float allows a feeding animal to reach the hay but prevents the animal from rooting in the hay. In a preferred embodiment, the feeder includes a hinged bottom through which hay can be loaded. An extensible handle provides leverage for flipping the feeder over.

DETAILED DESCRIPTION OF THE INVENTION

Figure 1:
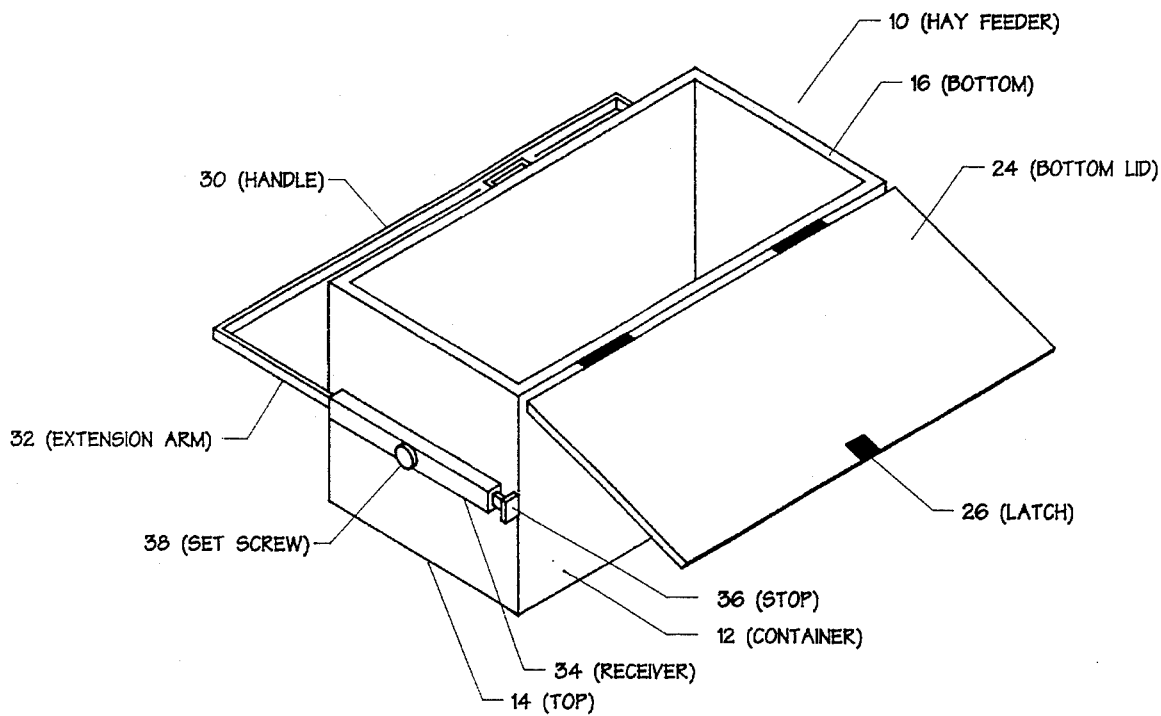
FIG. 1 is a bottom perspective view of the hay feeder of the present invention.
Figure 2:
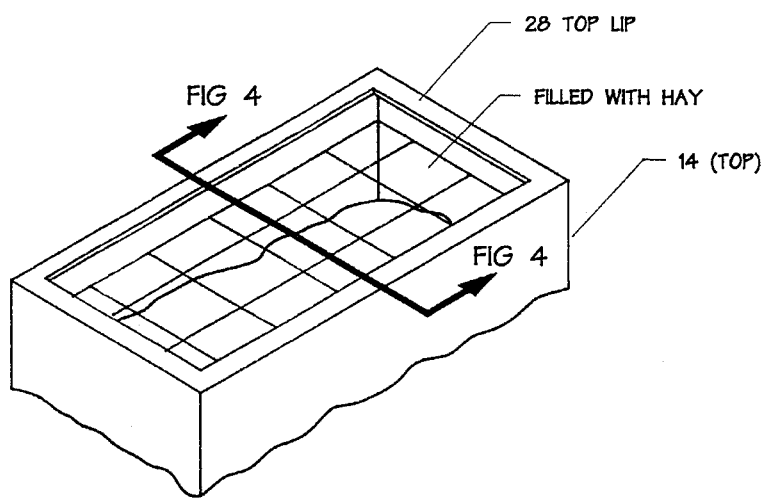
FIG. 2 is a top perspective view of the hay feeder of the present invention.
Figure 4:
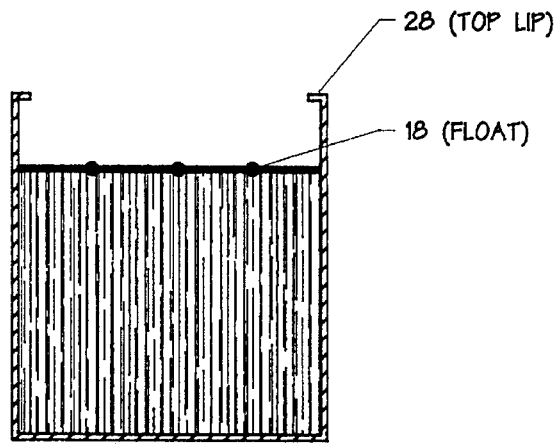
FIG. 4 is a side section view of the hay feeder of the present invention.
Figure 3:
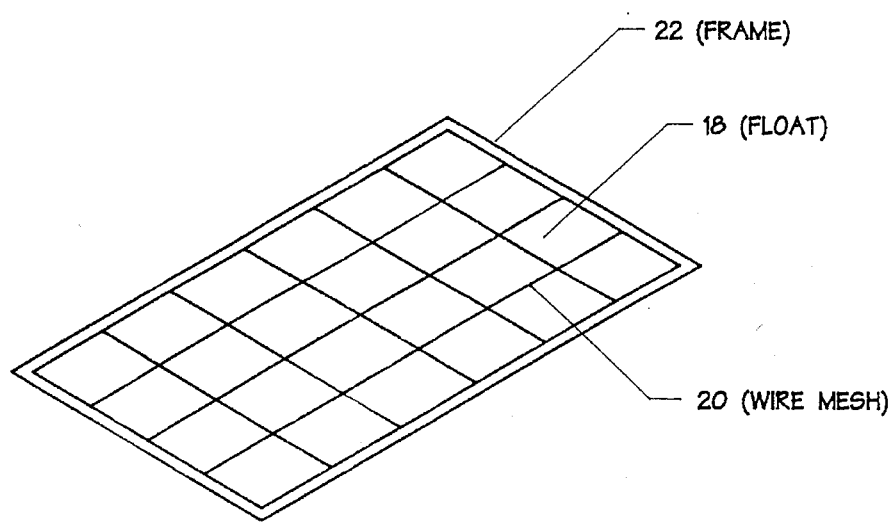
FIG. 3 is a top perspective view of the float of the present invention.

Referring to FIGS. 1–4, a hay feeder 10 comprises a container 12 having a top 14 and a bottom 16 and defining an interior and an exterior. The top 14 is open to allow access to the interior. A float 18 includes a wire mesh 20 and a frame 22 around the perimeter of the mesh 20. The float 18 is able to fit within the interior of the container 12. The float 18 is also able to slide up and down within the container 12 with the frame 22 in engagement with the interior.

In the preferred embodiment, the container 12 is box shaped and is sized to accommodate a rectangular bale of hay. The bottom 16 is open and includes a bottom lid 24 hinged to the container 12. A latch 26 secures the lid 24 in the closed position. A lip 28 extends around the perimeter of the top 14 and projects inwardly. The lip 28 prevents the float 18 from being removed from the top 14.

Also in the preferred embodiment, a handle 30 having extension arms 32 engages receivers 34. The receivers 34 are located on opposite ends of the container 12 and are oriented perpendicular to the long axis of the container 12. The extension arms 32 slide within the receivers 34 to allow the handle 30 to be extended to an open position away from the container 12 and a closed position adjacent the container 12. Stops 36 located on the ends of the extension arms 32, away from the handle 20, engage the receivers 34 in the open position to prevent the extension arms 32 from pulling through and disengaging from the receivers 34. A set screw 38 can be used to secure the handle 30 to prevent the extension arms 32 from sliding within the receivers 34.

In use, the feeder 10 is placed on its top 14 with the bottom 16 facing upward. The bottom lid 24 is opened and hay is loaded into the container 12. The bottom lid 24 is then closed and locked. Using the handle 30 as a lever, the feeder 10 is flipped over so that the top 14 is facing upward. The handle 30 can then be placed in the closed position so that it is out of the way. With the feeder upright, the float 18 rests on the hay. As hay is removed from the container 12 the float 18 moves down with the diminishing level of the hay. The wire mesh 20 allows the feeding animal to reach the hay but prevents the animal from rooting in the hay. When the hay is all consumed, the handle 30 can be used to flip the feeder 10 back to the bottom up position so that debris remaining in the feeder 10 will fall through the mesh 20.

In an exemplary feeder designed for feeding hay to horses, the wire mesh comprises 5/16" diameter wire arranged in a six inch by eight inch grid. The grid size and wire gauge can be adjusted to accommodate different size animals. Likewise the size and shape of the feeder can be made to accommodate large or small bales as well as round or square bales. Finally, the feeder of the present invention can be used with feeds other than hay such as compressed pellet feeds.

It will be understood by those skilled in the art that the foregoing has described a preferred embodiment of the present invention and that further variations in design and construction may be made to the preferred embodiment without departing from the spirit and scope of the invention defined by the appended claims.

What is claimed is:

1. A feeder for feeding hay to livestock, the feeder comprising:
   a container having an interior, an exterior, a top and a bottom, the container being open at the top; and
   a float including a wire mesh, the float being able to fit within the interior of the container, the float being able to move up and down within the container such that when hay is in the container the float rests on the hay and as hay is removed from the container the float moves down with the diminishing level of the hay, wherein the bottom is open and the feeder further includes a bottom lid attached to the container to shut the bottom.

2. A feeder for feeding feed to livestock, the feeder comprising:

a container having an interior, an exterior, a top and a bottom, the container being open at the top and at the bottom;

a float including a grid, the float fitting within the interior, the float being moveable up and down within the container such that when feed is within the container the float rests on the feed and as feed is removed from the container through the grid the float moves down with the diminishing level of the feed; and a lid attached to the container to close the bottom.

3. The feeder of claim 2 further comprising:

a lip adjacent the top, the lip projecting toward the interior to prevent the float from exiting the feeder through the top; and a handle extending from the feeder, the handle being extensible from a position in which the handle is adjacent the container to an open position in which the handle is spaced from the container, in the open position the handle being usable as a lever to flip the feeder from resting on its bottom to resting on its top and from resting on its top to resting on its bottom.

* * * * *